(12) United States Patent
Poepken et al.

(10) Patent No.: US 7,632,478 B2
(45) Date of Patent: Dec. 15, 2009

(54) PROCESS FOR PRODUCING SILICON

(75) Inventors: Tim Poepken, Friesoythe (DE); Raymund Sonnenschein, Frankfurt (DE)

(73) Assignee: Degussa AG, Duesseldorf (DE)

( * ) Notice: Subject to any disclaimer, the term of this patent is extended or adjusted under 35 U.S.C. 154(b) by 303 days.

(21) Appl. No.: 10/587,399

(22) PCT Filed: Jan. 6, 2005

(86) PCT No.: PCT/EP2005/050043

§ 371 (c)(1),
(2), (4) Date: Jul. 27, 2006

(87) PCT Pub. No.: WO2005/085133

PCT Pub. Date: Sep. 15, 2005

(65) Prior Publication Data

US 2007/0148075 A1  Jun. 28, 2007

(30) Foreign Application Priority Data

Mar. 2, 2004  (DE) ................ 10 2004 010 055

(51) Int. Cl.
*C01B 33/02* (2006.01)
(52) U.S. Cl. ............ 423/349; 423/348; 423/350
(58) Field of Classification Search ............ 423/324, 423/348–350
See application file for complete search history.

(56) References Cited

U.S. PATENT DOCUMENTS

| | | | |
|---|---|---|---|
| 4,102,764 A * | 7/1978 | Harvey et al. ............ 204/164 |
| 4,131,659 A * | 12/1978 | Authier et al. ............ 438/62 |
| 4,559,219 A * | 12/1985 | Herrick ............ 423/350 |
| 4,676,967 A | 6/1987 | Breneman et al. |
| 4,684,513 A | 8/1987 | Iya et al. |
| 4,818,495 A | 4/1989 | Iya et al. |
| 4,906,441 A | 3/1990 | Flagella et al. |
| 5,118,485 A * | 6/1992 | Arvidson et al. ............ 423/342 |
| 5,866,721 A | 2/1999 | Hofen et al. |
| 6,090,360 A * | 7/2000 | Herman ............ 423/348 |
| RE36,936 E * | 10/2000 | Keck et al. ............ 423/348 |
| 6,423,859 B1 | 7/2002 | Alig et al. |
| 6,887,448 B2 * | 5/2005 | Block et al. ............ 423/349 |
| 2004/0047795 A1 | 3/2004 | Konig et al. |
| 2004/0091630 A1 | 5/2004 | Sonnenschein |
| 2005/0014922 A1 | 1/2005 | Muller et al. |
| 2005/0192460 A1 | 9/2005 | Pascaly et al. |
| 2007/0166456 A1 | 7/2007 | Kuehnle et al. |
| 2007/0251447 A1 | 11/2007 | Muller et al. |

FOREIGN PATENT DOCUMENTS

| | | |
|---|---|---|
| DE | 38 42 099 | 6/1989 |
| DE | 41 27 819 | 2/1993 |
| JP | 2001064774 A * | 3/2001 |

OTHER PUBLICATIONS

U.S. Appl. No. 12/097,645, filed Jun. 16, 2008, Sonnenschein, et al.
U.S. Appl. No. 10/586,675, filed Jul. 20, 2006, Mueh, et al.
U.S. Appl. No. 10/581,458, filed Jun. 1, 2006, Adler, et al.
U.S. Appl. No. 12/088,286, filed Mar. 27, 2008, Adler, et al.
U.S. Appl. No. 11/575,226, filed Mar. 14, 2007, Sonnenschein, et al.
U.S. Appl. No. 11/567,774, filed May 10, 2005, Sonnenschein, et al.
U.S. Appl. No. 11/569,783, filed May 10, 2005, Sonnenschein, et al.

* cited by examiner

*Primary Examiner*—Steven Bos
*Assistant Examiner*—Anthony J Zimmer
(74) *Attorney, Agent, or Firm*—Oblon, Spivak, McClelland, Maier & Neustadt, L.L.P.

(57) ABSTRACT

The present invention relates to a process for producing silicon by thermal decomposition of a gaseous mixture comprising monosilane, monochlorosilane and, if desired, further chlorosilanes, e.g. dichlorosilane.

15 Claims, No Drawings

PROCESS FOR PRODUCING SILICON

The present invention relates to a process for producing high-purity silicon by thermal decomposition of silicon compounds in the gas phase and deposition of massive silicon.

The thermal decomposition of volatile compounds with deposition of a solid has long been known (CVD=chemical vapor deposition).

To obtain elemental silicon having a purity which allows it to be used in semiconductor technology or photovoltaic technology, processes for the thermal decomposition of gaseous silicon compounds are known. Such thermal decompositions for obtaining elemental silicon can, for example, be carried out using a thin, heated silicon wire or rod, also known as the Siemens process or "bell jar reactor", or in fluidized-bed reactors (WO 02/40400) using particles which have been introduced or generated in situ. A further possibility is thermal decomposition on the inside or outside of a tube. This tube can consist of silicon (WO 01/61070 A1) or of another material, e.g. silicon carbide, which minimizes contamination of the deposited silicon.

An aspect common to all processes is that the volatile silicon-containing compound is deposited onto seed material by thermal decomposition. The seed material is preferably silicon of the quality to be produced. Efforts are made to achieve virtually complete conversion in the deposition, and all the deposited silicon should if possible be obtained on the seed material or the surface provided for this purpose. Deposition of silicon on reactor walls or in pipes should be avoided if possible.

The energy necessary for the thermal decomposition can be introduced in various ways. In the known processes, it is, for example, introduced by direct electric resistance heating (Siemens process) or by means of radiation (fluidized-bed process). The apparatus surfaces which are usually cooled to avoid undesired deposition here cause an appreciable energy loss, which should be minimized for ecological and economic reasons.

In the deposition of elemental, polycrystalline silicon, monosilane (MS), dichlorosilane (DCS) or trichlorosilane (TCS) is generally used as silicon-containing reaction gas (U.S. Pat. No. 4,676,967, WO 01/61070, WO 02/40400). The respective reactions proceed according to the following reaction equations:

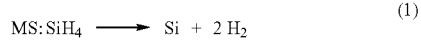
$$\text{MS: SiH}_4 \longrightarrow \text{Si} + 2\text{H}_2 \quad (1)$$

$$\text{DCS: SiH}_2\text{Cl}_2 \longrightarrow \text{Si} + 2\text{HCl} \quad (2)$$

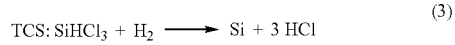
$$\text{TCS: SiHCl}_3 + \text{H}_2 \longrightarrow \text{Si} + 3\text{HCl} \quad (3)$$

Furthermore, the use of silane-containing mixtures in CVD processes is disclosed in the as yet unpublished DE application 102 43 022.5.

Apart from the actual silicon-containing gases, inert gases, e.g. noble gases, or reactants, e.g. hydrogen, cf. reaction equation (3), can be additionally present during the deposition. The temperatures required for deposition are in the range from about 600 to 900° C. in the case of monosilane and from about 1000 to 1250° C. in the case of DCS and TCS. The upper limit to the temperature is imposed by the melting point of silicon (1410° C.).

The silicon-containing reaction gases are usually subjected to a complicated fine purification after they have been prepared. In this, the concentrations of, in particular, dopant substances, e.g. elements of main groups III and V of the Periodic Table of the Elements, are reduced.

A disadvantage of the use of halogen-containing silicon compounds, e.g. DCS, TCS, is that hydrogen chloride is formed in the reaction and makes the use of corrosion-resistant materials necessary and is the cause of numerous secondary reactions. However, an advantage of the presence of hydrogen chloride is that it can react with impurities in the deposited silicon and thereby protects the silicon from contamination.

When trichlorosilane is used, a particular disadvantage for the economical preparation of silicon is that the maximum yield is, depending on the reaction temperature, from 20 to 25% of the silicon present in the silicon-containing reaction gas. The reason is that at least some dissolution of deposited silicon occurs in a reversal of the deposition reaction (3) (Si+3 HCl→TCS+$H_2$). The low yield combined with the increased consumption of electric energy make this deposition process uneconomical for the production of silicon for photovoltaic applications.

This disadvantage can be avoided by the use of monosilane as silicon-containing reaction gas, but this brings another disadvantage with it. At a sufficient temperature and residence time, monosilane decomposes completely according to equation (1), i.e. the maximum yield of silicon is virtually 100% in this case. However, a considerable proportion is not deposited in the desired massive form on the seed material provided. Rather, a large part is obtained in the form of fine dust which significantly reduces the effective yield of usable silicon. Furthermore, this dust is, due to its large surface area, very susceptible to oxidation on the surface and to contamination by extraneous substances which are absorbed and therefore has to be discarded. Considerable efforts in research and development are therefore aimed at reducing the amount of this fine dust or avoiding it entirely, cf., for example, Tejero-Ezpeleta: "Untersuchungen der Pyrolyse von Silan zur Herstellung von polykristallinem Silizium in einem Wirbelbettreaktor", thesis, University of Bochum 2002.

A further disadvantage is that monosilane is a supercritical gas at room temperature and high pressures and low temperatures are necessary to purify it by distillation.

Monosilane is at present prepared mainly by the dismutation of trichlorosilane (e.g. DE-A 100 17 168 A1, U.S. Pat. No. 3,968,199). In the dismutation, the trichlorosilane is converted stepwise into dichlorosilane, monochlorosilane and finally monosilane. In this method of preparation, the monosilane formed usually has to be separated off by distillation, with the higher-boiling, halogenated silanes being recirculated to the dismutation. Owing to the physical properties of the participating silanes, cf. Table 1, the separation by distillation requires low temperatures and high pressures. Low temperatures make it necessary to use expensive cooling methods such as low-temperature brine or liquid nitrogen, which have a critical effect on the economics of the process.

TABLE 1

Physical data for monosilane, monochlorosilane, dichlorosilane and trichlorosilane

| | Material | | | |
|---|---|---|---|---|
| | Mono-silane | Monochloro-silane | Dichloro-silane | Trichloro-silane |
| Critical Temp. [° C.] | −3.5 | 123 | 176 | 206 |
| Boiling point at | −112 | −30 | 8.3 | 31.8 |

TABLE 1-continued

Physical data for monosilane, monochlorosilane, dichlorosilane and trichlorosilane

| | Material | | | |
|---|---|---|---|---|
| | Mono-silane | Monochloro-silane | Dichloro-silane | Trichloro-silane |
| atmospheric pressure [° C.] | | | | |
| Boiling point at 5 bar [° C.] | −78 | 15 | 60 | 87 |
| Boiling point at 25 bar [° C.] | −28 | 85 | 137 | 170 |

The use of elevated pressure, e.g. 25 bar, makes it possible for monosilane to be condensed at −28° C., i.e. still under economical conditions. However, this requires additional compression of the silane-containing vapor. The reason for this is the thermal stability of the amines used as catalyst in the dismutation, which make a boiling temperature of the predominantly trichlorosilane-containing mixture of <100° C. necessary. However, compression is accompanied by high safety risks, since monosilane undergoes a violent reaction with atmospheric oxygen and water to form silicon dioxide, water and hydrogen, which can result in explosions. Very small leaks therefore have to be avoided, which is difficult and costly in the case of apparatuses with moving parts. Furthermore, very careful blanketing with inert gas is necessary to prevent intrusion of air or water at points of potential leaks in the compression apparatus.

It is an object of the invention to provide a process for producing silicon which at least partly avoids the abovementioned disadvantages.

This object has been able to be achieved by the process described below.

It has surprisingly been found that a gaseous mixture of monosilane as main component, preferred proportion ≦70% by weight, monochlorosilane and, if desired, amounts of higher-boiling silanes, preferably <15% by weight, as is obtained, in particular, as a mixture in the partial condensation at the top of a reactive rectification column for the dismutation of trichlorosilane, is extremely suitable, in a simple and economical manner, as silicon-containing reaction gas for the deposition of silicon. Thus, a gaseous mixture as is obtained in the partial condensation at the top of a distillation column installed downstream of a conventional fixed-bed dismutation reactor can advantageously be used according to the invention. The composition of this gaseous mixture can generally be adjusted by means of the combination of pressure and temperature in the condensation. The condensation is appropriately carried out at a pressure preferred for the dismutation, i.e., for example, at 5 bar abs. The condensation temperature can be set so that monosilane is obtained as main component; the temperature is advantageously in the range from +50 to −80° C., particularly preferably from +10 to −50° C.

The gaseous silane mixture obtained in the dismutation after condensation or a silane mixture according to the invention obtainable by combining the desired components can either be introduced directly into an apparatus for decomposition and deposition of silicon or be subjected to temporary storage in a vessel at a temperature above the condensation temperature. The vapor mixture can be fed to the decomposition in the form in which it is obtained or can be mixed with further gases, e.g. hydrogen, nitrogen or noble gases such as helium or argon, prior to the deposition. In the thermal decomposition, both hydrogen chloride and hydrogen are formed from the monochlorosilane (MCS) present in accordance with equation (4):

$$MCS:SiH_3Cl \rightarrow Si + 2HCl + 0.5H_2 \quad (4)$$

To carry out the thermal decomposition, the abovementioned gas mixture can, according to the invention, be subjected to the deposition processes known per se. Thus, for example but not exclusively, the decomposition or deposition can be carried out in a fluidized bed, on a tube or on a rod.

The present invention accordingly provides a process for producing high-purity silicon by thermal decomposition of a silane-containing mixture in the gas phase and deposition of massive silicon, wherein the gas mixture used comprises monosilane, monochlorosilane and, if desired, further silanes.

In the process of the invention, preference is given to using a gas mixture comprising up to 60% by weight of monosilane, up to 60% by weight of monochlorosilane and from 0 to 15% by weight of further silanes, where the sum of the silanes used is 100% by weight. However, it is also possible to use other mixing ratios. For example, but not exclusively, it is also possible to use from 10 to 50% by weight of monosilane or from 10 to 50% by weight of monochlorosilane.

Preference is thus also given to a gas mixture comprising monosilane and monochlorosilane together with at least one further silane from the group consisting of dichlorosilane and trichlorosilane.

In particular, a gas mixture as is obtained in the partial condensation after the dismutation of trichlorosilane, e.g. in a distillation column or reactive distillation downstream of a fixed-bed reactor, is used advantageously in the process of the invention.

In the process of the invention, the thermal decomposition and deposition is appropriately carried out a temperature in the range from 600 to 1250° C., preferably from 800 to 1100° C.

The thermal decomposition and deposition can advantageously be carried out at a pressure in the range from 1 mbar abs. to 100 bar abs., in particular from 10 mbar abs. to 5 bar abs.

Furthermore, the process of the present invention makes it possible for the process to be carried out continuously in a particularly advantageous way.

In general, the silane-containing feed mixture is appropriately stored as a gas or liquid in an intermediate storage from which the decomposition/deposition apparatus is supplied.

Furthermore, in the process of the invention, at least one further gas from the group consisting of hydrogen, nitrogen and noble gas such as helium or argon can be added to the silane-containing feed mixture before the gas mixture is fed into the decomposition/deposition apparatus.

To carry out the process of the invention, a tube reactor or a fluidized-bed reactor can be used as decomposition/deposition apparatus and the thermal decomposition and deposition can be carried out on a solid piece of silicon, particularly preferably on a heated silicon wire, rod, tube or cup.

In addition, at least part of the offgas obtained from the decomposition/deposition apparatus can be added to the silane-containing feed mixture, i.e. at least part of the offgas from the decomposition apparatus can be recycled. However, higher chlorosilanes are advantageously separated off from the offgas in a manner known per se before it is recycled.

The present invention likewise provides for the use of a monosilane- and monochlorosilane-containing fraction from a dismutation process for preparing monosilane as feed mixture in CVD processes for producing high-purity silicon.

The process of the invention has, in particular, the following advantages compared to the prior art:

- due to monosilane being present as main component, the deposition proceeds smoothly to high conversions;
- as a result of the presence of chlorine-containing silanes, hydrogen chloride is formed in addition to silicon in the thermal decomposition according to the equations (2), (3) and (4), but in a significantly reduced amount compared to deposition from pure DCS, TCS or a mixture of these; this results in the reverse reaction to the equation (3) occurring but to a significantly reduced extent, so that the conversion is influenced to a virtually negligible degree;
- the small amount of hydrogen chloride brings two significant advantages: firstly, the abovementioned purification effect due to preferential reaction of the hydrogen chloride with impurities is obtained,
- secondly, very small dust particles are preferentially attacked and dissolved by the hydrogen chloride as a result of their large surface area before they can grow further, which leads to significantly reduced formation of fine dust and thus increases the yield of usable, compact silicon;
- in the dismutation of TCS, the purification step to remove the chlorosilanes from the monosilane can be dispensed with, as a result of which either a complicated and expensive condensation at very low temperatures or a compression of a hazardous vapor stream can be eliminated, in addition to the saving of a pressure column compared to the previously described processes.

The process of the invention thus provides a comparatively simple and economical way of producing high-purity silicon, which advantageously gives an extraordinarily high yield of deposited silicon, leads to formation of a comparatively small amount of fine dust and, not least, is operated continuously in a particularly economical way.

EXAMPLE

In a heated tube reactor, a mixture of 58% of $SiH_4$, 40% of MCS and 2% of higher chlorosilanes is decomposed at a pressure of 1.2 bar and a temperature of 900° C. to deposit silicon. Within the 5 hour duration of the experiment, a layer thickness of 2.8 mm is obtained, from which a deposition rate of about 10 μm/min can be calculated.

This is of an order of magnitude between the deposition from monosilane and that from trichlorosilane.

The formation of fine dust is barely measurable and is significantly lower than in the deposition from monosilane.

The invention claimed is:

1. A process for producing high-purity silicon, comprising thermally decomposing a gas phase mixture comprising monosilane and a monochlorosilane, and depositing silicon, wherein the thermal decomposition and deposition are carried out at a temperature in a range from 600 to 1250° C. and at a pressure of from 1.2 bar abs. to 5 bar abs wherein the gas phase mixture comprises from 10 to 60% by weight of monosilane, from 10 to 60% by weight of monochlorosilane and from 0 to 15% by weight of further silanes, where the silanes present in the gas mixture add up to 100% by weight.

2. The process as claimed in claim 1, wherein the gas phase mixture further comprises one or more additional silanes.

3. The process as claimed in claim 1, wherein the gas phase mixture comprises monosilane and monochlorosilane together with at least one further silane selected from the group consisting of dichlorosilane and trichlorosilane.

4. The process as claimed in claim 1, wherein the gas phase mixture is obtained in a partial condensation after a dismutation of trichlorosilane.

5. The process as claimed in claim 1, wherein the process is carried out continuously.

6. The process as claimed in claim 1, wherein the process is carried out in a decomposition/deposition apparatus.

7. The process as claimed in claim 6, wherein a silane-containing feed mixture is stored as liquid or gas in an intermediate storage and supplied to the decomposition/deposition apparatus.

8. The process as claimed in claim 7, wherein at least one additional gas selected from the group consisting of hydrogen, nitrogen and noble gas is added to the silane-containing feed mixture before the gas mixture is fed to the decomposition/deposition apparatus.

9. The process as claimed in claim 7, wherein at least part of an offgas from a decomposition/deposition apparatus is added to the silane-containing feed mixture.

10. The process as claimed in claim 6, wherein a tube reactor or a fluidized-bed reactor is used as the decomposition/deposition apparatus and the thermal decomposition and deposition is carried out on solid pieces of silicon.

11. The process as claimed in claim 1, further comprising producing the gas phase mixture from a dismutation of trichlorosilane and then thermally decomposing the gas phase mixture to deposit the silicon.

12. The process as claimed in claim 11, wherein the gas phase mixture is obtained at a top of a reactive rectification column.

13. The process as claimed in claim 1, wherein the gas phase mixture comprises from 10 to 50% by weight of monosilane, from 10 to 50% by weight of monochlorosilane and from 0 to 15% by weight of further silanes, where the silanes present in the gas mixture add up to 100% by weight.

14. The process as claimed in claim 1, wherein the thermal decomposition and deposition is carried out on a silicon wire, rod, tube or cup.

15. The process as claimed in claim 1, which produces a small amount of hydrogen chloride and also produces very small dust particles, wherein the dust particles are dissolved by the hydrogen chloride.

* * * * *